A. J. COLLAR.
HYDRAULIC VALVE.
APPLICATION FILED SEPT. 24, 1913.

1,128,228. Patented Feb. 9, 1915.

WITNESSES:
Charles Bekles
Thos Eastberg

INVENTOR
Adoniram J. Collar.
BY G. H. Strong.
ATTORNEY

A. J. COLLAR.
HYDRAULIC VALVE.
APPLICATION FILED SEPT. 24, 1913.
1,128,228.
Patented Feb. 9, 1915.
2 SHEETS—SHEET 2.
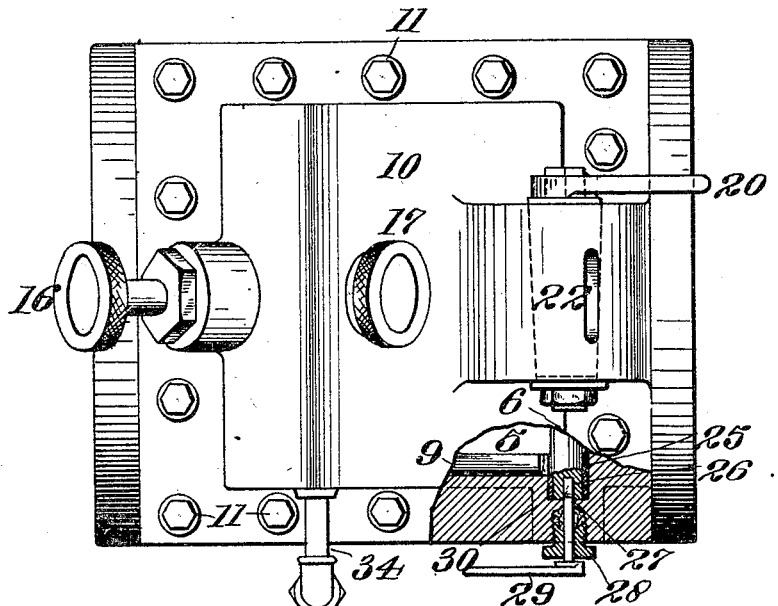
Fig. 3.
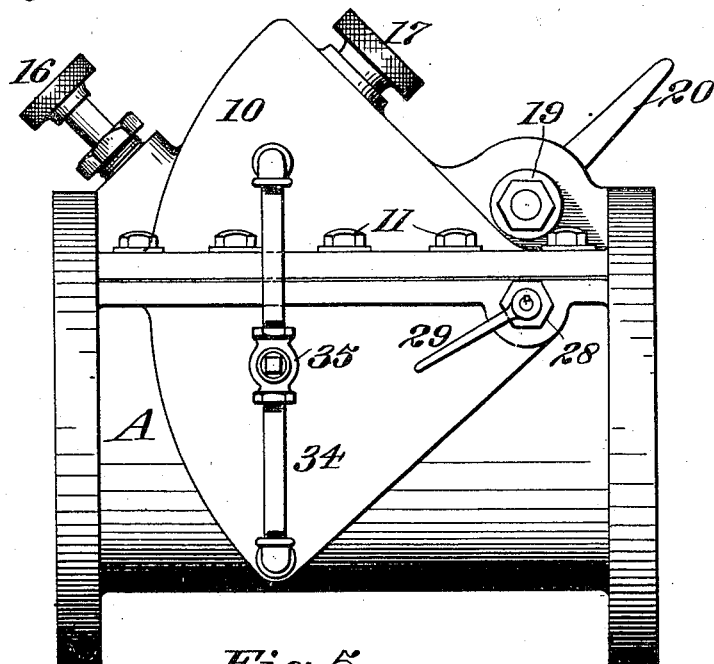
Fig. 4.
Fig. 5.
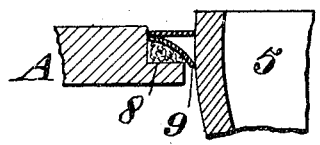
WITNESSES:
Charles Pickles
Thos Leistberg
INVENTOR
Adoniram J. Collar
BY G. H. Strong
ATTORNEY

UNITED STATES PATENT OFFICE.

ADONIRAM J. COLLAR, OF YREKA, CALIFORNIA.

HYDRAULIC VALVE.

1,128,228.

Specification of Letters Patent. Patented Feb. 9, 1915.

Application filed September 24, 1913. Serial No. 791,529.

*To all whom it may concern:*

Be it known that I, ADONIRAM J. COLLAR, a citizen of the United States, residing at Yreka, in the county of Siskiyou and State of California, have invented new and useful Improvements in Hydraulic Valves, of which the following is a specification.

This invention relates to a hydraulic swinging gate valve.

The object of the invention is to provide a simple, cheaply manufactured gate valve which is particularly adapted for large size pipe lines and which is so constructed that the valve proper may be opened or closed by the pipe line pressure, through a system of valve-controlled ports formed in the casing of the valve.

Another object of the invention is to provide means by which the valve may be locked in the open or closed position.

Other objects will appear hereinafter.

The invention consists of the parts and the construction and combination of parts as hereinafter more fully described and claimed, having reference to the accompanying drawings, in which,—

Figure 1:
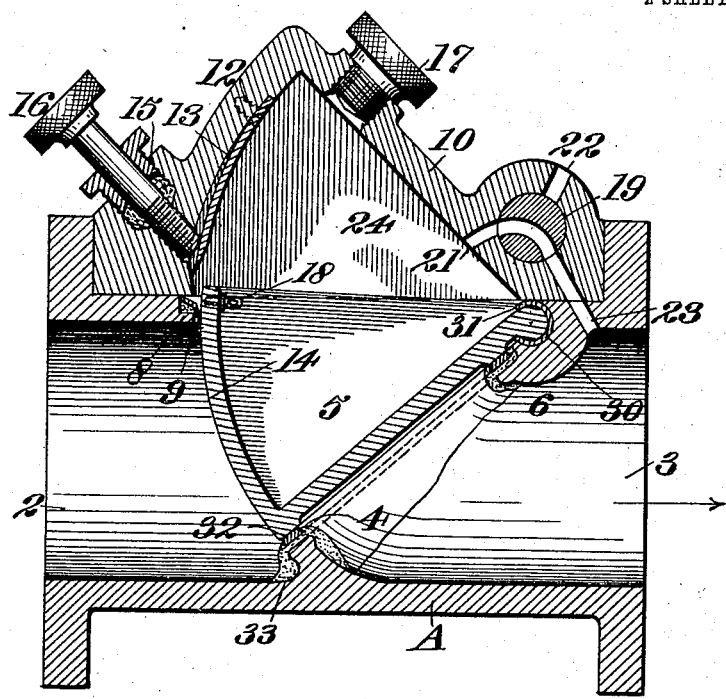
Figure 2:
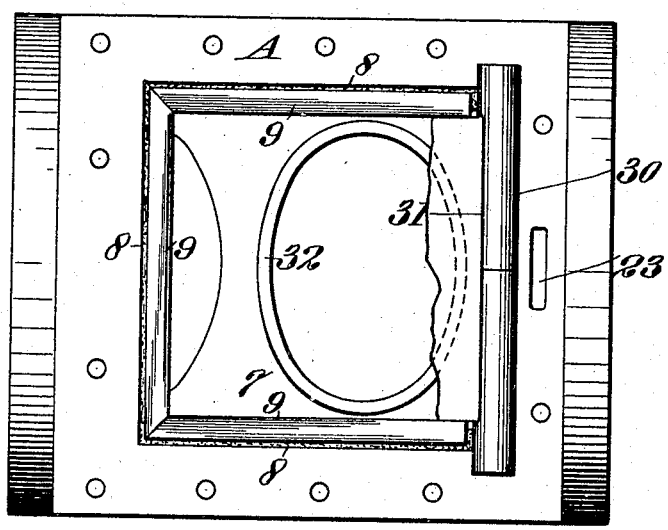

Figure 1 is a vertical longitudinal section of the valve. Fig. 2 is a plan view of same showing the upper housing and valve removed. Fig. 3 is a plan view of the valve partly broken away, showing the connection of the indicating mechanism with relation to the valve. Fig. 4 is a side elevation of the valve. Fig. 5 is a modification of the packing means.

Referring to the drawings: A indicates a valve casing having an inlet opening 2 and an outlet opening 3, and formed within the casing between said openings is a valve seat 4 upon which a valve 5, pivoted at 6, is adapted to seat. The upper side of the casing is provided with an opening 7 through which the valve 5 is inserted when the parts are assembled, and is further provided with a packing groove 8 extending around the sides of the opening so as to pack the sides and front portions of the valve, thus preventing any undue leakage at this point. The packing groove under normal conditions is filled with a soft packing which is covered by three thin strips of angle brass 9, the ends of which are cut on an angle, as indicated in Fig. 2, to fit snugly against each other. The combination of the soft packing, together with the brass strips, forms an ideal packing in this instance, as the water and air pressure above the strips act to automatically compress the packing and force it out into the contact with the face of the sides of the valve.

For the purpose of securing the packing within the groove 8, and also for the purpose of forming a housing for the valve 5 when this is lifted into the open position, a housing 10, secured as at 11, has been provided. Suitably secured within this housing, as at 12, is a spring clamping plate 13, having a width approximately the same as the segmental face 14 of the valve, and extending through a packing ring 15 formed in the front face of the housing 10, in a position where it will contact with the lower end of the clamping plate 13, is an adjusting screw 16 provided for the purpose of throwing the clamping plate 13 into clamping engagement with the segmental face 14 of the valve when this is lifted into the open position. The housing 10 is further provided with an aperture closed by a removable plug 17 through which aperture a wire hook or like implement may be inserted to lift the valve when no water is being conveyed through the pipe-line; a suitable hook or projection 18 being secured to the inner face of the valve 5 for this purpose.

Mounted in the rear portion of the housing 10 is a two-way valve 19 provided with an operating lever 20, and communicating with said valve is a series of ports or passages 21—22 and 23; the port 21 being so positioned as to communicate with the valve receiving chamber 24 formed in the housing, while the port 23 communicates with the discharge end of the casing A. The port 22 is only provided as an auxiliary exhaust port, the use of which will be later described.

In operation when it is desired to feed water through the valve in the direction of the arrow *a*, it is only necessary to turn the valve 19 into the position indicated in Fig. 1. This will immediately bring the ports 21 and 23 into communication with each other and relieve the chamber 24 of any water under pressure which may have leaked by the packing surrounding the valve. The valve 5 thus relieved of any pressure upon its upper side, will immediately open, as its lower surface is then exposed to the full pressure of the fluid conducted through the valve. The opening of
the valve will thus permit a free flow
through the valve in the direction indicated, as the pressure within the casing A
will retain the valve in the open position as
long as the chamber 24 is relieved of pressure. The valve 5 may be permanently
locked or held in this position by advancing the set screw 16, as the forward movement of the set screw 16 will immediately
force the clamping plate 13 against the
outer face 14 of the valve with sufficient
pressure to retain this in the open position.
When it is desired to close the valve 5 it
becomes necessary to turn the valve 19 to a
position where communication between the
ports 21 and 23 is closed. The water leaking past the packing 9 and entering the
chamber 24 is thus enabled to build up a
pressure therein which, acting on the valve
surface exposed thereto, is sufficient to
overcome the opposing pressure against the
valve at the inlet 2, whereby, to force the
valve in a downward direction against the
seat 4, thus closing the valve and stopping
the flow of water through the casing. The
entrance of the water into chamber 24 incidentally compresses the air which may be
trapped therein, and the expansive force
of this compressed air tends to move the
packing into engagement with the valve
face and sides as above stated.

By referring to Fig. 3 it will be seen that
the valve proper is provided with a pivot
pin or gudgeon 25, one end of which is
sufficiently slotted, as indicated at 26, to receive a flat-ended shaft 27 which is so positioned as to extend through a stuffing-box
28, formed in the side of the casing. The
outer end of the shaft 27 is provided with
an indicating arm 29 which is so positioned
as to assume the same position as the valve;
the shaft 27 being secured in the gudgeon
of the valve will thus move in unison with
same and cause the indicating arm to register the exact position of the valve within
the casing.

By referring to Figs. 1 and 2 it will be
seen that the gudgeons supporting the valve
5 are surrounded with bushings 30 which
are slotted, as indicated at 31, to permit
their insertion. These bushings may be
babbitted in place upon the valve and within the journal formed in the casing A and
will thus eliminate expensive machine work
or fitting in connection with this part of
the valve mechanism. Similarly a ring 32
may be placed upon the valve seat 4 and
babbitted into position, as indicated at 33,
thus eliminating any expensive machine
work and fitting with relation to the valve
seat.

By referring to Fig. 4, it will be seen that
the forward or pressure side of the casing
A is connected with the chamber 24, formed
in the upper housing 10, by a pipe 34, provided with a valve 35. The valve 35 is normally closed but may be opened to force
high pressure water into the chamber 24 if
the valve 5 should have any tendency to
stick in the upper housing. It will be understood that enough water leakage into the
chamber 24, through the packing 8, takes
place to close the valve, and that the valve
35 is only used under extreme conditions
when the valve becomes accidentally clogged
by sediment or other foreign material.

By again referring to Fig. 1, it will be
seen that it is possible to turn the valve into
such position as to form communication between the ports 21 and 22; the valve 19,
however, is only turned into this position
when it is desired to open the valve 5 against
a high pressure on the discharge side.

The valve constructed as here shown is
simple and compact in construction and
positive in operation. The position of the
several ports shown insures the proper opening and closing of the valve 5 under any and
all conditions, whether it be high or low
pressure, and the general design and position of the movable parts permit of the
cheapest possible construction without reducing the efficiency or reliable operation
of the valve.

By providing a valve constructed as here
shown, it is also possible to feed water in
the opposite direction. This is accomplished
by turning the valve into register with port
22, which will allow the valve to open; and
the closing of same is accomplished by turning the valve into register with the port 23.
A suitable form of packing consisting of a
strip of flat brass, indicated in Fig. 5, that
lies on top of the angle brass, is used in this
instance to resist the downward pressure
from the upper chamber.

The materials and finish of the several
parts of the valve are such as experience
and judgment of the manufacturer may dictate.

Having thus described my invention what
I claim and desire to secure by Letters Patent, is:

1. In a hydraulic gate valve, a casing
having a valve seat therein, a pivoted valve
in the casing having a segmental face, a
housing on the casing into which the valve
is adapted to swing, a spring clamping plate
substantially the same width as that of said
segmental face having its upper end secured
to the housing and having its lower end
free and adapted to engage the segmental
face of the valve, and means for engagement with the free end of said clamping
plate to move and hold same in frictional engagement with the segmental face of the
valve.

2. In a hydraulic gate valve, a casing
having a valve seat therein, a valve pivoted in the casing and having sides and a segmental face which connects the sides, said casing having a groove which extends along said sides and face of the valve, soft compressible packing in said groove, and freely movable strips of metal which are disposed on the upper face of the packing and have downwardly bent portions which contact with the said face and sides of the valve, said strips being movable by fluid pressure to compress the packing.

In testimony whereof I have hereunto set my hand in the presence of two subscribing witnesses.

ADONIRAM J. COLLAR.

Witnesses:
 C. J. LUTTRELL,
 W. T. BROWN.